April 11, 1967  A. A. AKIN, JR  3,313,026

SELECTIVELY VARIABLE TELESCOPIC SIGHT RETICULE

Filed July 13, 1965

INVENTOR.
ALFRED A. AKIN, JR.

United States Patent Office 3,313,026
Patented Apr. 11, 1967

---

3,313,026
SELECTIVELY VARIABLE TELESCOPIC SIGHT RETICULE
Alfred A. Akin, Jr., West Covina, Calif., assignor to David P. Bushnell, Pasadena, Calif.
Filed July 13, 1965, Ser. No. 471,661
2 Claims. (Cl. 33—50)

This invention relates to improvements in optical sighting instruments, and more particularly to an improved telescopic sight reticule such as may be utilized in gunsights, surveying instruments, and the like to provide a reference for indicating the center of the field of sight, and thereby function as a reference point for alignment of the gun bore, transit, or the like.

These telescopic sights are usually equipped with reticules having horizontal and vertical cross-hairs which are stretched taut and secured in such a manner so as to intersect at right angles. Alternately, "cross-hairs" may be provided by etching or engraving a transparent member with a pair of lines which intersect at right angles which lines are then filled with a suitable opaque substance.

Generally, the cross-hairs cover a minute of angle or less so as to obscure a minimum of the field of sight, or target. Cross-hairs of this type are particularly well suited for accurate sighting where light conditions are relatively good and the person utilizing the telescopic sight has sufficient time to sight the gun, surveying instrument or the like. However, when light conditions are such that it is relatively dark or the object sighted upon is against a dark background it may be difficult, if not impossible, to properly aim a telescopic sight utilizing cross-hairs that only cover approximately a minute of angle. In addition, particularly when hunting, the target is moving so rapidly that instantaneous sighting of a telescopic gun sight only provided with conventional cross-hairs is difficult. Under such conditions it is virtually impossible to move the gun into aiming position and align the center of the very fine cross-hair reticule on the target.

Heretofore, various devices have been proposed in which the effective width of the telescopic sight reticule could selectively be varied to facilitate aiming of the sight regardless of the level of illumination of the target. Generally, they are provided with selectively operable actuating means including mechanical linkages which of necessity must pass through the exterior wall of the telescopic sight thereby giving rise to a problem of maintaining the interior of the telescopic sight in a hermetically sealed condition at the point where the linkage passes through the exterior wall of the telescopic sight.

It is therefore an object of this invention to provide an improved selectively variable telescopic sight reticule wherein the effective size of the reticule center may be enlarged or the reticule center accentuated when unfavorable sighting conditions are encountered.

Another object of this invention is to provide a selectively variable telescopic sight reticule which is provided with means positioned externally of the sight to selectively accentuate the cross-hair reticule center without having to provide an aperture in the exterior wall of the telescopic sight for the through passage of an operating linkage thus substantially precluding the possibility of the seepage of moisture, dirt, or the like, into the interior of the sight.

A further object of this invention is to provide a selectively variable telescopic sight reticule wherein a pointer may be accurately superimposed upon a portion of a conventional cross-hair reticule in precise axial alignment therewith so as to effectively accentuate the reticule center when unfavorable sighting conditions are encountered.

Still another object of this invention is to provide a novel construction for selectively variable telescopic sight reticule wherein the effective size of a portion of the reticule may be varied by superimposing a pointer thereover which is magnetically actuated from the exterior of the telescopic sight to selectively move the pointer through an arcuate path, in substantially the same plane as the cross-hair reticule, from a first position out of the line of sight into a second position superimposed upon the cross-hair reticule.

These and other objects of the invention, as well as the many advantageous features thereof, will become apparent upon perusal of the following detailed description and by referring to the accompanying drawing in which a preferred form of the invention is illustrated.

Figure 2:
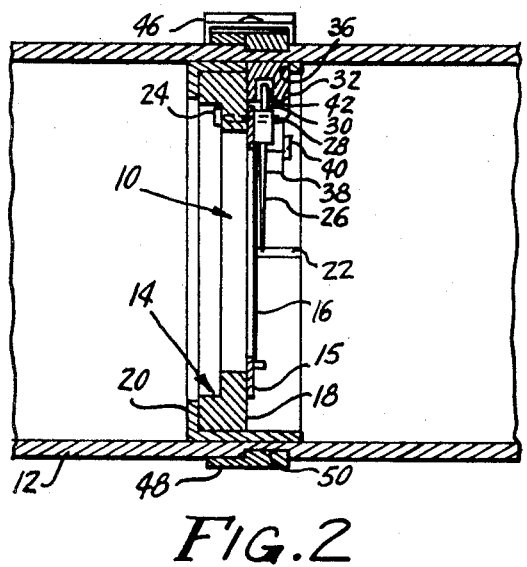
FIGURE 2 is a longitudinal vertical cross-sectional view of the device of FIGURE 1 taken substantially along the plane of the line 2—2 of FIGURE 1.

Referring now to the drawings, an exemplary embodiment of the telescopic sight reticule comprising the present invention is indicated generally at 10, which for illustrative purposes only, is shown mounted within the tubular casing 12 of a telescopic sight such as utilized for a telescopic gun sight or the like.

The telescopic sight reticule 10 includes a reticule support means indicated generally at 14 which includes a reticule support 15 provided with a reticule aiming point means or cross-hair 16. The reticule support 14 may be fixedly secured or integrally machined with an annular ring 18 which is in turn fixedly secured to or also integrally machined with an annular ring 20 having an axial flange which is provided with a plurality of longitudinally extending compression slots 22 thereby permitting the ring 20 and its integrally secured ring 18 and reticule support 14 to be press fit into the tubular casing 12 and frictionally retained therein, for example.

As seen best in FIGURE 2, the annular ring 18 is provided with an axially extending pivot pin 24 which may be press fit or threadably received therein. The reticule center accentuating means, or pointer 26 is pivotally supported for limited arcuate rotation about the axis provided by the pivot pin 24 and is pivotally secured thereon by peening the free end 28 of the pivot pin 24. The pointer 26 is further provided with an outwardly projecting radially disposed operating linkage 30 which is rigidly secured to the hub of the pointer 26.

Figure 1:
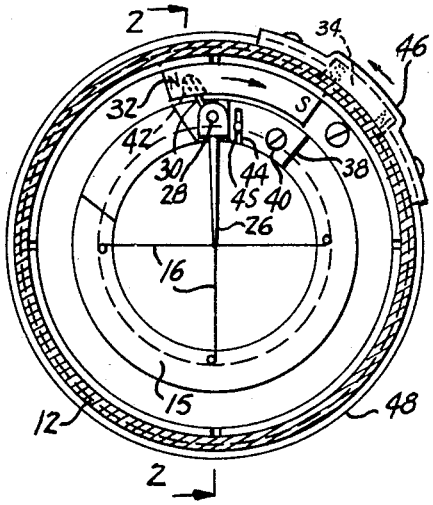
FIGURE 1 is a transverse vertical cross-sectional view of a tubular casing of a telescopic sight within which the device of the present invention is mounted.
Figure 3:
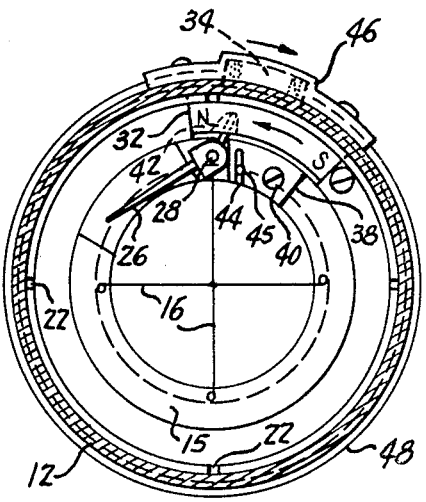
FIGURE 3 is a transverse vertical cross-sectional view of the device of FIGURES 1 and 2.

The linkage 30 operatively connects the pointer 26 with a portion of a magnetic actuating means which comprises an interior magnet 32 and an exterior magnet 34 which co-act, in a manner to be described, to permit actuation or movement of the pointer 26 between the use position shown in FIGURE 1 and the non-use position shown in FIGURE 3.

As seen best in FIGURE 1, the interior magnet 32 is slidably retained within a slot 36 provided in the ring 20, and is retained therein by a boss 38 which is removably secured to the reticule support 15 by means of a bolt 40 which passes through a suitable aperture in the boss 38 and is threadably received in a suitable threaded aperture provided in the reticule support 15.

The linkage 30 is received within an oversized aperture 42 provided in the interior magnet 32 and accordingly, it may be seen that as the magnet is slidably moved between the positions shown in FIGURES 1 and 3 the pointer will accordingly be moved between the use position overlying the cross-hairs 16, as shown in FIGURE 1, and the non-use position as shown in FIGURE 3.

The alignment of the pointer 26 with respect to the cross-hairs 16 may be adjusted by limiting the travel of the hub of the pointer 26 by means of a tensioning slot 44 in the boss 38 within which is threadably received a tapered set screw 45 thus permitting a limited adjustment of the effective length of the boss 38 thereby camming the hub of the pointer 26 to adjust the travel of the pointer 26 in the direction of the boss 38.

Figure 4:
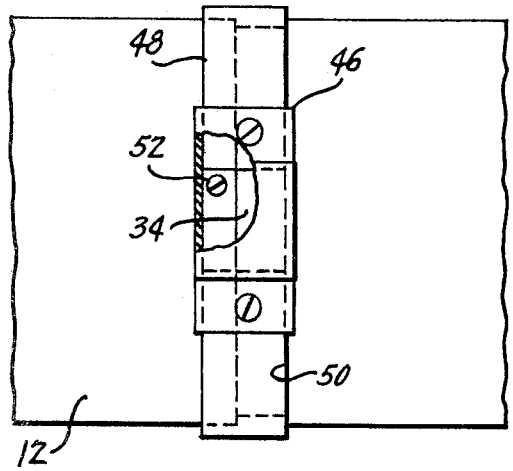
FIGURE 4 is a top plan view of a portion of the tubular casing of a telescopic sight which includes the selectively variable sight reticule of the present invention, with portions broken away to show interior details.

The exterior magnet 34 is adhesively or otherwise secured to the underside of a retainer plate 46 which is removably secured to a split ring 48 by fastener means, such as screws, which ring is rotatably received in an annular groove 50 provided in the tubular casing 12. As seen best in FIGURE 4, a stop pin, or screw 52 secured to the casing 12 limits the rotation of the annular ring 48.

In operation when light conditions are poor and it is desirable to move the pointer 26 from the non-use position of FIGURE 3 into the use position shown in FIGURE 1 to accentuate the cross-hairs 16, it is merely necessary to rotate the ring 48 clockwise. As may be seen from the relative polarity of the opposed magnets 32 and 34, this will cause the interior magnet 34 to be repelled in a counter-clockwise direction thereby pivoting the pointer 26 into the position shown in FIGURE 1.

Conversely, to move the pointer from the use position shown in FIGURE 1 to the non-use position shown in FIGURE 3, it is merely necessary to rotate the ring 48 counterclockwise. Accordingly, as the S pole of the exterior magnet 34 approaches the N pole of the interior magnet 32 it will cause magnet 32 to move in a clockwise direction thus returning the pointer 26 to a non-use position as shown in FIGURE 3.

Although not shown, the pointer 26 may be provided with a bulbous portion on its free end, which portion would be in overlying relationship to the intersection of the cross-hairs 16.

It will be understood, of course, that all of the various components of the selectively variable sight reticule 10, with the exception of the magnets, are preferably fabricated from non-magnetic materials so as not to interfere with the action of the magnetic actuating means.

It may therefore be seen that there has been provided a novel structure for a selectively variable telescopic sight reticule which overcomes many of the disadvantages associated with adjustable reticules proposed heretofore.

The invention has been shown by way of example only and many modifications and variations may be made therein without departing from the spirit of the invention. It is to be understood, therefore, that the invention is not limited to any specified form or embodiment except insofar as such limitations are set forth in the claims.

I claim:

1. In combination with a telescopic gun sight having a tubular casing, a reticule mounted internally therein by a support substantially in a plane perpendicular to the longitudinal axis of the casing and a retractible element for accentuating the reticule center, wherein the improvement comprises, means pivotally mounting the retractible element on the support for displacement in a plane parallel to the plane of said reticule, magnetic actuating means mounted for movement between limits internally of the casing displacing said retractible element between operative and retracted positions corresponding to said limits, a selectively movable magnet, and guide means mounting the magnet exteriorly on the casing in operative relation to the magnetic actuating means for magnetically transferring movement to the actuating means between said limits thereof.

2. The combination of claim 1 wherein said magnetic actuating means comprises, an arcuate magnetic element slidably mounted radially outwardly of the support, and a link arm projecting from the retractible element radially outwardly from the support into a recess formed in the magnetic element.

References Cited by the Examiner
UNITED STATES PATENTS

| | | | |
|---|---|---|---|
| Re. 24,692 | 8/1959 | Oswald | 33—50.5 |
| 2,371,511 | 3/1945 | Faus | 33 |
| 2,601,784 | 7/1952 | Rose | 73—362.1 |
| 3,177,591 | 4/1965 | Jolley | 33—224 |

LEONARD FORMAN, *Primary Examiner.*

J. M. FREED, *Assistant Examiner.*